(12) United States Patent
Charier et al.

(10) Patent No.: US 8,944,765 B2
(45) Date of Patent: Feb. 3, 2015

(54) BELLOWS TYPE SEALING DEVICE FOR PARTITION PENETRATION BY A CONNECTING ROD OF A TURBOPROP FAN BLADE ORIENTATION CONTROL SYSTEM

(75) Inventors: Gilles Alain Charier, La Grande Paroisse (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 806 days.

(21) Appl. No.: 13/236,689

(22) Filed: Sep. 20, 2011

(65) Prior Publication Data

US 2012/0070289 A1    Mar. 22, 2012

(30) Foreign Application Priority Data

Sep. 20, 2010 (FR) .................... 10 57497

(51) Int. Cl.
| | | |
|---|---|---|
| B64C 11/06 | (2006.01) | |
| F01D 7/00 | (2006.01) | |
| F01D 25/16 | (2006.01) | |
| F01D 25/18 | (2006.01) | |
| F02C 7/06 | (2006.01) | |
| F02K 3/072 | (2006.01) | |

(Continued)

(52) U.S. Cl.
CPC *F01D 7/00* (2013.01); *F01D 25/16* (2013.01); *F01D 25/183* (2013.01); *F02C 7/06* (2013.01); *F02K 3/072* (2013.01); *F16J 3/047* (2013.01); *F16J 15/52* (2013.01); *F05D 2220/324* (2013.01); *F05D 2220/325* (2013.01); *F05D 2240/55* (2013.01); *F05D 2250/232* (2013.01); *F05D 2260/50* (2013.01); *F05D 2260/56* (2013.01); *F05D 2260/79* (2013.01)

USPC ......................................................... 416/153

(58) Field of Classification Search
CPC ......... F01D 7/00; F01D 25/16; F01D 25/183; F02C 7/06; F02K 3/072; F16J 15/52; F16J 3/047
USPC ......................................... 416/151, 153, 160
See application file for complete search history.

(56) References Cited

U.S. PATENT DOCUMENTS

| | | |
|---|---|---|
| 3,033,046 A | 5/1962 | Rodda |
| 4,657,484 A | 4/1987 | Wakeman et al. |

(Continued)

FOREIGN PATENT DOCUMENTS

| | | |
|---|---|---|
| CH | 98132 | 3/1923 |
| EP | 0 395 278 A1 | 10/1990 |

(Continued)

OTHER PUBLICATIONS

U.S. Appl. No. 13/582,254, filed Aug. 31, 2012, Gallet.

(Continued)

*Primary Examiner* — Nathaniel Wiehe
*Assistant Examiner* — Jeffrey A Brownson
(74) *Attorney, Agent, or Firm* — Oblon, Spivak, McClelland, Maier & Neustadt, L.L.P.

(57) ABSTRACT

The invention relates to a sealing device for the partition penetration of a connecting rod of a turboprop fan blade orientation control system. The device includes a bellows (60) of trunconical shape designed to allow passage of the connecting rod (50*a*) and having, at its wider end, means (62, 64) of attachment to the partition (58) to be sealed and, at its narrower end, an O-ring through which the connecting rod is free to slide.

5 Claims, 3 Drawing Sheets

(51) Int. Cl.
*F16J 3/04* (2006.01)
*F16J 15/52* (2006.01)

(56) References Cited

U.S. PATENT DOCUMENTS

| | | | |
|---|---|---|---|
| 4,913,623 A * | 4/1990 | Schilling et al. | 416/51 |
| 5,011,166 A | 4/1991 | Watts | |
| 5,152,668 A | 10/1992 | Bulman et al. | |
| 5,174,716 A * | 12/1992 | Hora et al. | 416/26 |
| 5,595,474 A * | 1/1997 | Girard | 416/1 |
| 2005/0250586 A1 | 11/2005 | Yamada et al. | |

FOREIGN PATENT DOCUMENTS

| | | |
|---|---|---|
| EP | 1 548 339 A1 | 6/2005 |
| GB | 598584 | 2/1948 |

OTHER PUBLICATIONS

French Preliminary Search Report and Written Opinion issued May 30, 2011, in French 1057497, filed Sep. 20, 2010 (with English Translation of Categories of Cited Documents).

\* cited by examiner

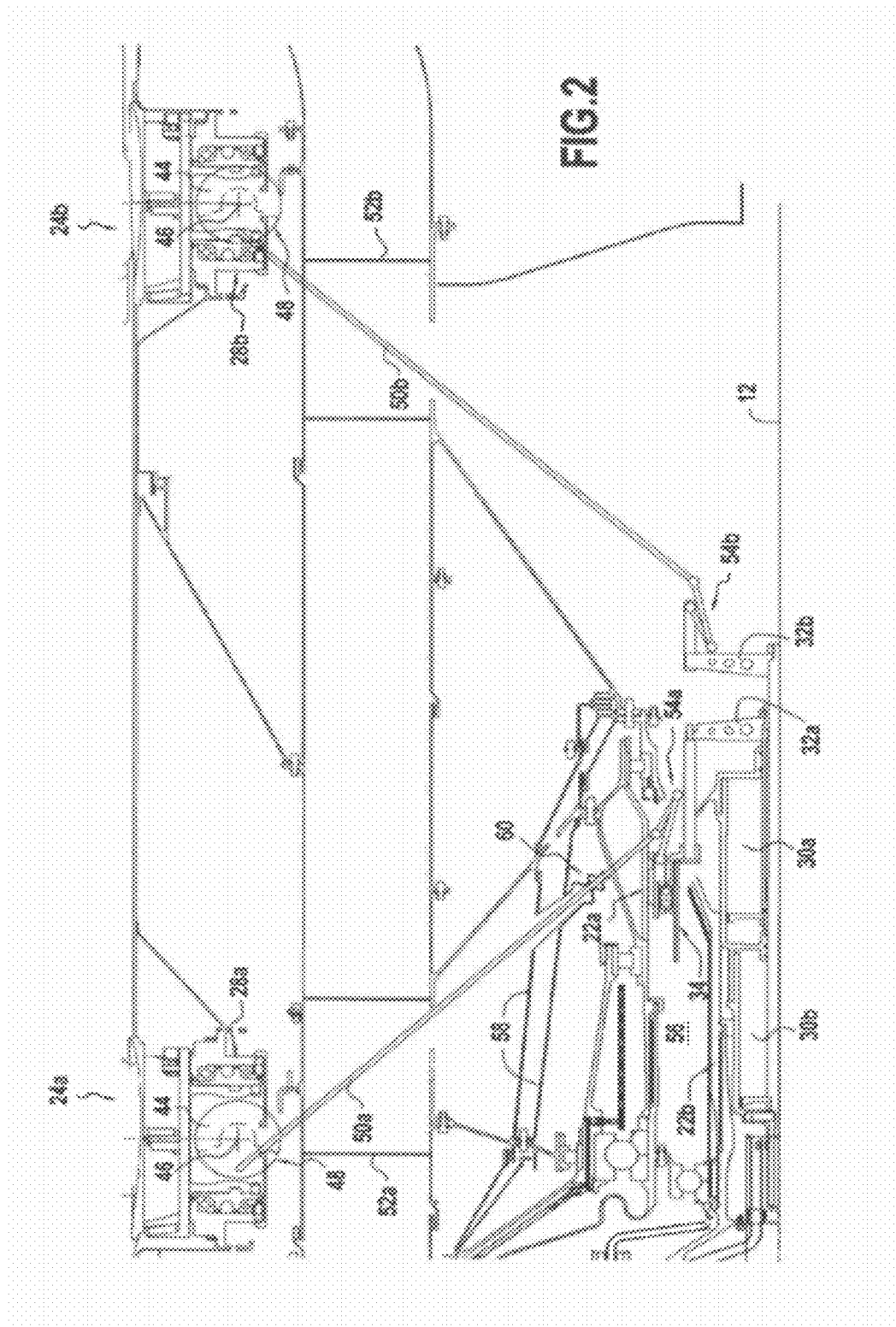

US 8,944,765 B2

BELLOWS TYPE SEALING DEVICE FOR PARTITION PENETRATION BY A CONNECTING ROD OF A TURBOPROP FAN BLADE ORIENTATION CONTROL SYSTEM

BACKGROUND OF THE INVENTION

The present invention relates to the general field of controlling the orientation of the fan blades of a turboprop unit.

A preferred field of application of the invention is that of dual propeller airplane turboprops.

A dual propeller airplane turboprop comprises a turbine with two counter-rotating rotors each driving an unshrouded fan blade set. In this type of airplane engine, the orientation of the fan blades (also called pitch control) constitutes one of the parameters allowing the engine thrust to be managed.

French patent application no. 10 51458 filed on 1 Mar. 2010 by the Applicant describes a system for controlling the orientation of the fan blades of such a turboprop unit. In this document, each blade is coupled, for control of its orientation, to a blade root support mounted pivotably on a rotating ring by means of a bevel gearset, one pinion of this gearset being supported by the blade root support and the other pinion bearing a counterweight. A cylinder centered on the axis of rotation of the rotating ring and rotating integrally with the turbine rotor is connected to each counterweight through a radial connecting rod. By actuating the cylinder, the connecting rods act on the counterweights according to the rod-and-crank principle in order to bring about synchronized rotation of the blade roots.

Such a control system has numerous advantages. In particular, it is reliable and light because it has relatively few parts compared to prior art control systems.

The connecting rods of this system extend radially from the cylinder to the blade root supports. Also, some of these connecting rods must pass through an oil chamber wherein several ball bearings of the turboprop are installed. This is particularly the case for the connecting rods of the control system for the upstream blade set.

Now these oil chambers are rotating, such that the oil that is present is subjected to a centrifugal force. Consequently, in order to avoid any oil leak to the outside it is necessary to seal the passage through the walls of these oil chambers by the control system connecting rods.

OBJECT AND SUMMARY OF THE INVENTION

The present invention therefore has as its principal object to satisfy these expectations by offering a device making it possible to ensure oil-tightness at the wall of the oil chamber traversed by the control system connecting rods.

In conformity with the invention, this goal is attained by means of a bellows of trunconical shape designed to be traversed by the connecting rod and having, at its wider end, means of attachment to the wall to be sealed and, at its narrower end, an O-ring through which the connecting rod is free to slide.

Oil-tightness is ensured, firstly at the wider end of the bellows by its attachment to the wall to be sealed, and also at the narrower end of the bellows by the O-ring wherein the connecting rod can slide. In operation, the control system connecting rod is subjected to radial displacements as well as to lateral displacement. The pleated section of the bellows and its trunconical shape allow it to absorb the lateral motions of the connecting rod. Furthermore, the sliding of the connecting rod through the O-ring of the device allows the connecting rod's radial motions to be absorbed.

The wider end of the bellows can include a mounting clip designed to be fixed to the wall to be sealed. Additionally, the bellows is preferably made of metal. Furthermore, the bellows can include a pleated section toward its narrower end.

The invention also relates to a system for controlling the orientation of the fan blades of a turboprop including at least one set of fan blades with adjustable orientation, said assembly being integral in rotation with a rotating ring connected mechanically to a rotating housing, each blade of the set being coupled, for controlling its orientation, with a blade root support mounted pivotably on the rotating ring by means of a bevel gearset consisting of a first bevel gear integral with the blade root support and centered on an axis radial to the rotating ring and a second bevel gear integral with the rotating ring, centered on an axis tangential to said rotating ring, and bearing a counterweight eccentric with respect to its axis of rotation, the system also including a cylinder centered on the axis of rotation of the rotating ring, rotating integrally with the rotating housing and the rod whereof is connected to each counterweight through radial connecting rods and bellcranks, the system also including, for each radial connecting rod, a sealing device as defined previously.

The invention also relates to a dual propeller turboprop, comprising a turbine with two counter-rotating housings and two fan blade sets with adjustable orientation rotating integrally with two rotating rings respectively linked to the rotating housings, control of the orientation of the fan blades of at least one of the sets being achieved by a system as defined previously.

BRIEF DESCRIPTION OF DRAWINGS

Other features and advantages of the present invention will appear from the description given below, with reference to the appended drawings which illustrate an embodiment of it that is in no way limiting. In these figures:

FIG. 2 is an enlarged view of FIG. 1 showing the location of the sealing device according to the invention;

DETAILED DESCRIPTION OF ONE EMBODIMENT

Figure 1:
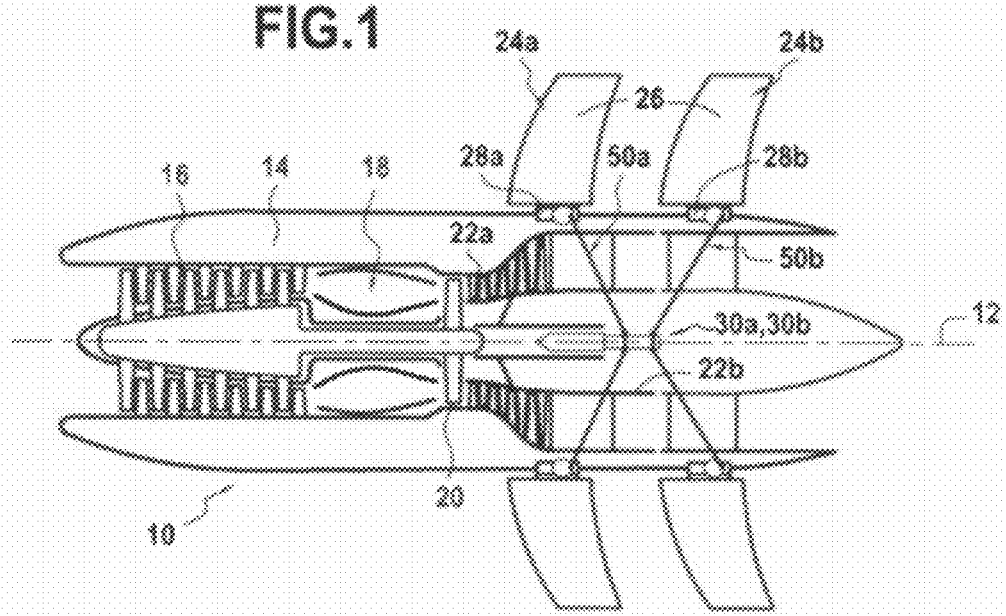
FIG. 1 is a schematic longitudinal section view of a dual propeller turboprop equipped with a propeller orientation control system to which the invention particularly applies.

FIG. 1 shows very schematically an embodiment of an airplane turboprop 10 of the dual propeller type.

The turboprop 10 includes in particular a longitudinal axis 12 and an annular nacelle 14 arranged coaxially about the longitudinal axis. From upstream to downstream, it also includes a compressor 16, a combustion chamber 18 and a turbine 20 called the power turbine driving in rotation (directly or indirectly) two rotating housings $22a$, $22b$.

The turboprop 10 also includes an upstream (or forward) set $24a$ and a downstream (or rear) set $24b$ of fan blades with adjustable orientation. The fan blades 26 of each set $24a$, $24b$ are more precisely mounted on a rotating ring $28a$ $28b$ in the form of an annular platform centered on the longitudinal axis 12 of the turboprop.

Each rotating housing $22a$, $22b$ carries and drives in rotation one of the rotating rings $28a$, $28b$ on which is mounted one of the sets $24a$, $24b$ of fan blades with adjustable orientation.

The turboprop 10 also includes a system for controlling the orientation of the fan blades of the upstream 24a and downstream 24b sets. This control system is described in French patent application no. 10 51458 filed on 1 Mar. 2010 by the Applicant, the contents whereof are incorporated here by reference.

As shown in FIG. 2, the control system comprises two cylindrical actuators 30a, 30b actuating fan blade orientation changing mechanisms of the upstream and downstream sets, these mechanisms consisting in particular of connecting rods described earlier.

The cylinders 30a, 30b are coaxial, centered on the longitudinal axis 12 and rotating integrally with a shaft of the rotating housing 22b driving in rotation the downstream set 24b.

The respective rods 32a, 32b of these two cylinders translate axially along the longitudinal axis 12, the rod 32a of the outer cylinder 30a allowing adjustment of the orientation of the fan blades of the upstream assembly 24a and the rod 32b of the inner cylinder 30b allowing adjustment of the orientation of the fan blades of the downstream assembly 24b.

A ball bearing 34 is mounted between the rod 32a of the inner cylinder and the fan blade orientation changing mechanism of the upstream assembly in order to transmit the axial thrusts of the inner cylinder to the mechanism while still leaving these entities free to turn in opposite directions.

Figures 3A, 3B:
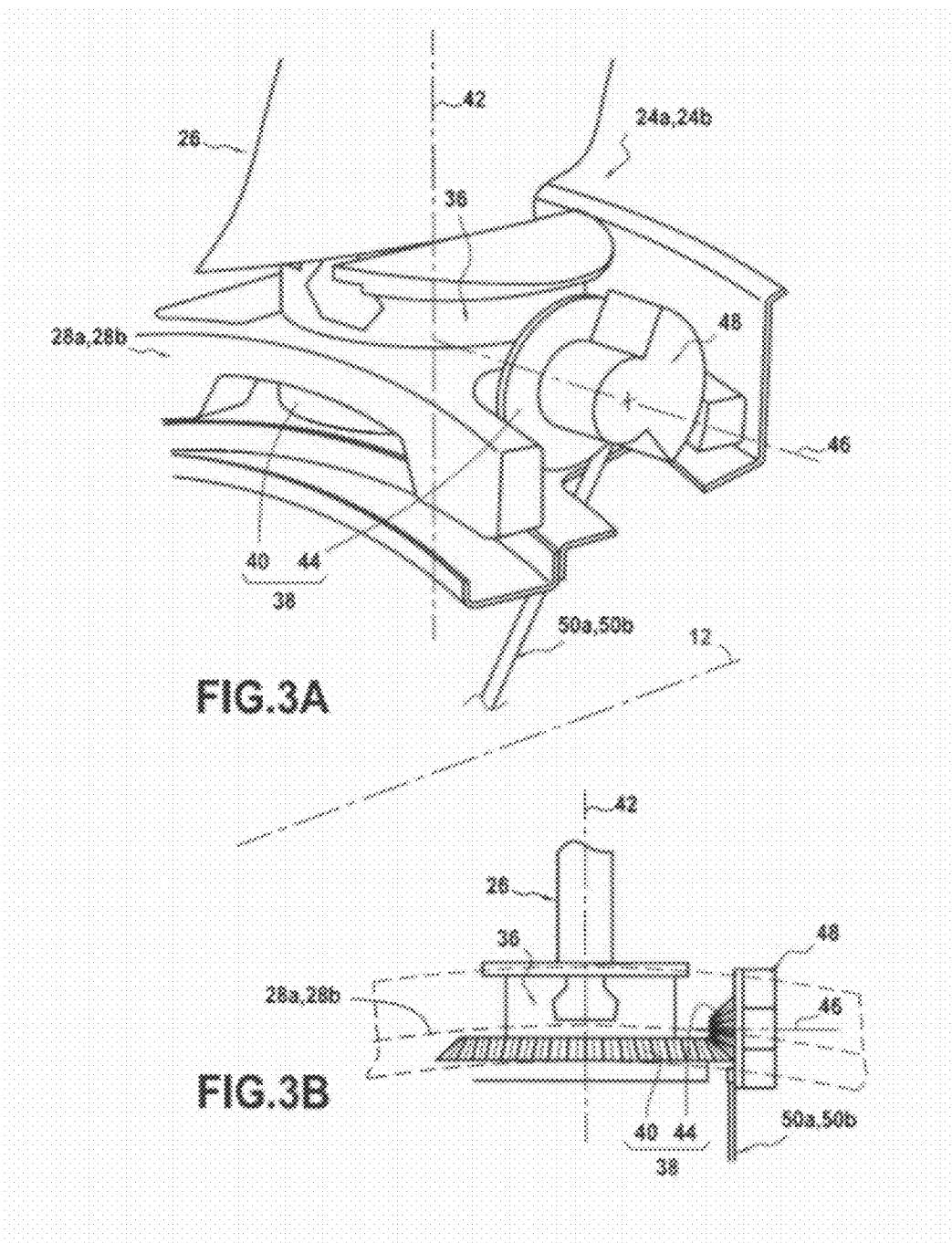
FIGS. 3A and 3B show schematically the kinematics of the control system of FIGS. 1 and 2.

Further, as shown in FIGS. 3A and 3B, each blade 26 of the sets 24a, 24b is coupled to a blade root support 36 pivoting on the rotating ring 28a, 28b by means of a bevel gearset 38. This bevel gearset is made up of a first bevel gear 40, integral with the blade root support and centered on an axis radial to the rotating ring, and a second bevel gear 44 integral with the rotating ring and centered on an axis 46 tangential to this rotating ring.

The number of teeth of the first bevel gear 40 is selected to be substantially twice the number of teeth of the second bevel gear 44. Thus, a rotation of 90° of the second bevel ear will cause a rotation of approximately 45° of the second bevel gear.

As for the second bevel gear 44 of each bevel gearset, it bears a weight constituting a counterweight 48, this being eccentric with respect to the axis of rotation 46 of the gear. The mass of this counterweight is predefined depending in particular on the characteristics of the fan blades.

Each mechanism for changing the orientation of the fan blades also includes a plurality of connecting arms which connect the rod 32a, 32b of the corresponding cylinder 30a, 30b to the counterweight 48 of the corresponding set of fan blades.

These connecting arms have the function of converting the axial displacement of the cylinder rod into a synchronized rotation of the counterweights of the corresponding set of fan blades about their respective axis of rotation 46.

To this end, each connecting arm includes in particular a radial connecting rod 50a, 50b passing through a housing extension 52a, 52b of the turboprop and having one end connected to the corresponding counterweight and the other end connected to a branch of a bellcrank 54a, 54b, the other branch whereof is connected to the rod 32a, 32b of the corresponding cylinder.

Each connecting arm also includes a guiding connecting rod (not shown in the figures) one end whereof is connected to the connection between the two branches of the bellcrank and the other end whereof serves as a supporting guide for the radial connecting rod.

At the cylinders 30a, 30b, the turboprop 10 also includes an oil chamber 56 within which are arranged the various ball bearings supporting the shafts of the rotor in rotation (and in particular the ball bearing 34).

This oil chamber (which is subjected to the effects of the centrifugal force due to the rotation of the rotors) is centered on the longitudinal axis 12 of the turboprop and is delimited radially on the outside by an annular partition 58 integral with the rotor driving the upstream set 24a.

This partition 58 which consists of a double wall is therefore traversed from side to side by the radial connecting rods 50a of the fan blade orientation changing mechanism of the upstream set.

In order to avoid any leakage of oil from the oil chamber 56, it is necessary to ensure oil-tightness of this wall penetration 58 by the radial connecting rods 50a.

Figure 4:
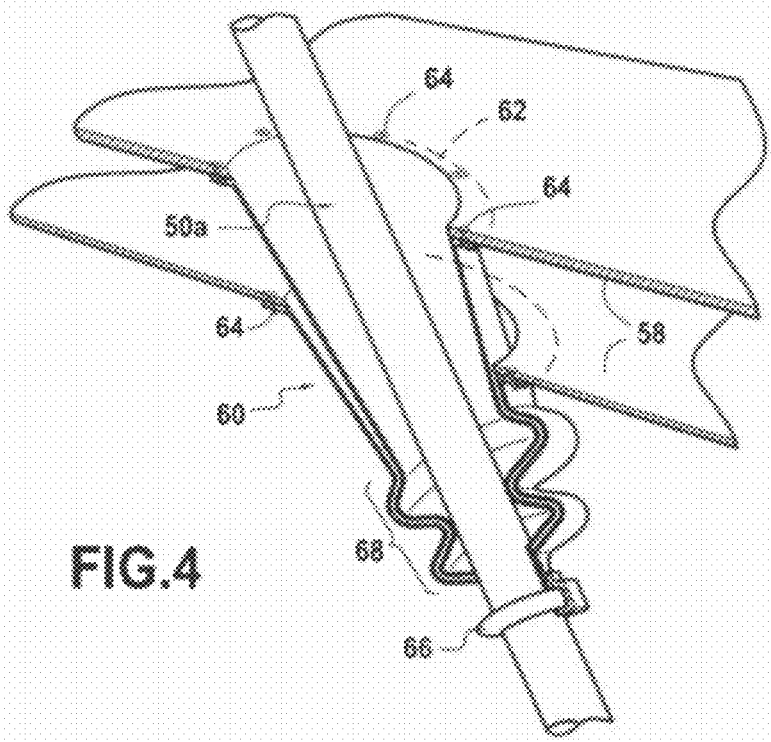
FIG. 4 is an enlarged view of the sealing device of FIG. 2.

To this end, according to the invention, there is provided for each radial connecting rod a sealing device consisting in particular of a bellows 60 of trunconical shape which is mounted surrounding the portion of the connecting rod passing through the partition 58 (see FIG. 4).

At its wider end, this bellows includes an annular mounting clip 62 mounted on the partition through bolt/nut systems 64. At its opposite end (that is at the narrower end), the bellows includes an O-ring 66 through which the radial connecting rod 50a is free to slide. It is also at this narrower end that the pleated section 68 of the bellows is formed.

In addition, the bellows is advantageously made of a metal (for example of the Inconel® type) which gives it a certain mechanical performance.

Thus, oil-tightness is provided, firstly at the wider end of the bellows by its attachment to the partition 58 to be sealed, and also at the narrower end of the bellows by the O-ring 66 wherein the radial connecting rod 50a can slide.

In operation, the radial connecting rod 50a of the control system is subjected both to radial displacements (that is parallel to its axis of rotation) and to lateral displacements. The pleated section 68 of the bellows and its trunconical shape allow it to absorb the lateral motions of the connecting rod. As for the radial motions of the connecting rod, they are absorbed by the sliding of the rod through the O-ring 66.

It will be noted that on the embodiment of FIG. 4, the partition 58 to be sealed has two walls spaced radially apart from one another. Thus, in order to ensure perfect oil-tightness, the bellows 60 of the sealing device includes two jackets, one of them being attached to one of the walls of the partition and the other being attached to the other wall. Of course, in the case of a single-wall partition to be sealed, the bellows can have a single jacket.

The invention claimed is:

1. A system for controlling the orientation of the fan blades of a turboprop comprising at least one set of fan blades with adjustable orientation, said set being integral in rotation with a rotating ring connected mechanically with a rotating housing, each blade of the set being coupled, for control of its orientation, to a blade root support pivotably mounted on the rotating ring by means of a bevel gearset made up of a first bevel gear integral with the blade root support and centered on an axis radial to the rotating ring and a second bevel gear attached to the rotating ring, centered on an axis tangential to said rotating ring, and bearing a counterweight eccentric with respect to an axis of rotation of the second bevel gear, the system also comprising a cylinder centered on the axis of rotation of the rotating ring, rotating integrally with the rotating housing, and a rod thereof is connected to each counterweight through radial connecting rods and bellcranks, the system also comprising, for each radial connecting rod, a bellows of trunconical shape through which passes the radial connecting rod and having, at its wider end, means of attachment to a partition to be sealed and, at its narrower end, an O-ring through which the radial connecting rod is free to slide.

2. A system according to claim 1, wherein the wider end of the bellows includes an attachment clip attached to the partition to be sealed.

3. A system according to claim 1, wherein the bellows is made of metal.

4. A system according to claim 1, wherein the bellows includes a pleated section toward its narrower end.

5. A dual propeller turboprop, comprising a turbine having two counter-rotating housings and two sets of fan blades with adjustable orientation rotating integrally with a first and a second rotating ring connected respectively with the rotating housings, the control of the orientation of the fan blades of at least one of the sets being carried out by each blade of the set being coupled, for control of its orientation, to a blade root support pivotably mounted on the first rotating ring by means of a bevel gearset made up of a first bevel gear integral with the blade root support and centered on an axis radial to the first rotating ring and a second bevel gear attached to the first rotating ring, centered on an axis tangential to said first rotating ring, and bearing a counterweight eccentric with respect to an axis of rotation of the second bevel gear, the system also comprising a cylinder centered on the axis of rotation of the first rotating ring, rotating integrally with the rotating housing, and a rod thereof is connected to each counterweight through radial connecting rods and bellcranks, the system also comprising, for each radial connecting rod, a bellows of trunconical shape through which passes the radial connecting rod and having, at its wider end, means of attachment to a partition to be sealed and, at its narrower end, an O-ring through which the radial connecting rod is free to slide.

* * * * *